United States Patent
Best et al.

(10) Patent No.: US 6,645,538 B2
(45) Date of Patent: Nov. 11, 2003

(54) COMPOSITE FLEXIBLE FROZEN CONFECTION COMPRISING A GEL AND PROCESS FOR ITS PREPARATION

(75) Inventors: Thomas Eric Best, Dublin, OH (US); Paul Ronald Renati, Dublin, OH (US); Singhachai Surintrspanont, Dublin, OH (US)

(73) Assignee: Nestec S.A., Vevey (CH)

( * ) Notice: Subject to any disclaimer, the term of this patent is extended or adjusted under 35 U.S.C. 154(b) by 140 days.

(21) Appl. No.: 09/803,377

(22) Filed: Mar. 9, 2001

(65) Prior Publication Data

US 2002/0168452 A1 Nov. 14, 2002

(51) Int. Cl.⁷ ............................ A23G 9/00; A23G 9/02
(52) U.S. Cl. ................ 426/91; 426/100; 426/101; 426/134; 426/515; 426/565; 426/575
(58) Field of Search ............................ 426/100, 101, 426/134, 91, 575, 565, 515

(56) References Cited

U.S. PATENT DOCUMENTS

| | | | |
|---|---|---|---|
| 2,191,352 A | 2/1940 | Oprean | 99/134 |
| 3,671,268 A | 6/1972 | Blake et al. | 99/136 |
| 3,752,678 A | 8/1973 | Gekinson et al. | 99/136 |
| 4,140,807 A * | 2/1979 | Braverman | 426/573 |
| 4,500,553 A * | 2/1985 | Liggett et al. | 426/101 |
| 4,985,263 A * | 1/1991 | Klug et al. | 426/302 |
| 4,986,080 A | 1/1991 | Grigoli et al. | 62/75 |
| 5,374,436 A | 12/1994 | White et al. | 426/249 |
| 5,698,251 A * | 12/1997 | Dahms et al. | 426/249 |
| 5,858,427 A * | 1/1999 | Cain et al. | 426/101 |
| 6,025,003 A | 2/2000 | Jadraque et al. | 426/515 |
| 6,231,901 B1 * | 5/2001 | Sharkasi et al. | 426/101 |
| 6,379,724 B1 * | 4/2002 | Best et al. | 426/68 |
| 6,399,134 B1 * | 6/2002 | Best et al. | 426/565 |

FOREIGN PATENT DOCUMENTS

| | | |
|---|---|---|
| EP | 0 512 274 | 11/1992 |
| EP | 0560 052 | 9/1993 |
| EP | 0 864 256 | 9/1998 |
| JP | 2000 004793 | 1/2000 |
| WO | WO 99/38386 | 8/1999 |

OTHER PUBLICATIONS

Chen, Y., et al., "The rheology of $K^+ - K$–carageenan as a weak gel," *Carbohydrate Polymers*, 50, pp. 109–116 (2002).
Lundin, L. et al., "Rheology and microstructure of Ca– and Na– K – carrageenan and locust bean gum gels," *Carbohydrate Polymers*, 34, pp. 365–375 (1997).

* cited by examiner

Primary Examiner—Nina Bhat
(74) Attorney, Agent, or Firm—Winston & Strawn LLP

(57) ABSTRACT

A composite flexible frozen confection containing a distinct block(s) of a gel component, that is combined with one or more frozen dessert components, in such a manner that the composition may exhibit hand-held flexibility without significant separation of one or more of the components.

10 Claims, 1 Drawing Sheet

COMPOSITE FLEXIBLE FROZEN CONFECTION COMPRISING A GEL AND PROCESS FOR ITS PREPARATION

TECHNICAL FIELD

The present invention relates to a composite flexible frozen confection containing a distinct block(s) of a gel component, that is combined with one or more frozen dessert components, in such a manner that the composition may exhibit hand-held flexibility without significant separation of one or more of the components. The present invention further teaches a method of preparing such a food composition for frozen dessert applications.

The key features of the invention are the fun, or play factor and the absence of the messiness of eat that would otherwise ensue. Other aspects of multiple components are also present such as having more than one visual appearance such as color and clarity, more than one texture, mouthfeel, flavor, flavor release etc. upon consumption. In particular, the frozen dessert component provides the refreshment aspect that complements the physical strength necessary for the wobbly gel component.

BACKGROUND ART

WO 99/38386 relates to a water ice containing stabilizers and having a channeled structure of air passages. It does not teach flexibility or combinations having blocks of gel components with other blocks of frozen dessert component.

EP 0864256 teaches a way of molding an ice confection using multipart molds and liquid nitrogen as a cryogen. It does not teach a way to achieve flexibility of multicomponent products.

JP 2000 004793 relates to an iced dessert with a jelly-like solid item coated with ice cream. Product is made by coating solid or fluid edible material with ice cream, or using concentric nozzles. It teaches viscosity control and use of sweet potato fiber as additive to ice cream and does not teach flexibility.

JP 1999 346659 relates to a swirl design food based upon molding and nozzle devices. This does not relate to a gel, or to a method of making a gel, and does not teach flexibility.

EP 0560052 relates to the use of a gelatin coating (not a polyanionic) upon ice cream. The teaching is for low calorie products. There is no teaching regarding wobbliness or prevention of disengagement of gel layer.

U.S. Pat. No. 3,752,678 involves dipping an ice cream into a thixotropic batch containing alginate. This product contains the separate gel phase as a distinct component block (a coating) and emphasis is upon achieving a jelly coating, not upon wobbliness.

In any situation of bending a typical flexible material (like a piece of eraser), it is not just the change in the direction of the arc that must be considered. There is typically one surface of the flexible material that suffers dilation (the outside of the arc) and the opposite surface suffers compression (the inside of the arc). Both dilation and compression effects typically lead to other indirect but significant changes in surface geometry. These indirect changes have large contributions to the disengagement of the components of the composition. The present invention minimizes both the occurrence and the consequences of these side effects.

These side effects are explained as follows.

A dilated surface also typically undergoes some narrowing in one direction, to compensate for the stretching in the other direction. A compressed surface also undergoes some lateral broadening and buckling, in order to tolerate the material displacement that is resultant from the squeezing of its fabric in the other direction. Although these changes are side effects of the creation of the bend, they are nonetheless substantive, geometric displacements.

When such changes in surface geometry of a flexible gel occur in juxtaposition with a more rigid conjoined structure such as a frozen dessert; surface separation and delamination of the union is wholly expected. Bending movements lead to substantial breaking of at least one of the more brittle non-gel components. Such broken fragments of the non-gel component(s) then typically fall off the gel component.

Thus there is a need for a composition in which two or more components of different rigidity are combined, yet in which the application of bending motions does not cause the falling apart of the composition in any significant way. Another need is for a composition that, despite being able to be wiggled about, does not generate a very messy eating experience. The present invention now satisfies these needs.

SUMMARY OF THE INVENTION

Surprisingly, it has been discovered that with the present composition, compositions having greater structural integrity are provided such that meesy eating experiences due to breakage are substantially minimized. In fact although the more rigid component does still crack, or craze to some degree, this is not excessive. Further, the more rigid component does not readily separate or disengage from the gel component and survives repeated wiggles without disengaging. Part of this is due to the discovery that the adhesiveness of the gel phase should not be too high.

The invention thus concerns a composite frozen confection containing one or more component block(s) of polyanionic gel(s) in conjunction with more rigid component such that:

a) During warming to room temperature the confection develops flexibility,
b) When flexible, the confection may be bent or wobbled such that one end may distort to an angle of at least 5 degrees from other end and
c) During the first 4 distortions, not more than 5% by weight of the rigid component falls off.

In this invention the gel phase is separate, as a distinct and elongated component block, such as a filling, a layer, a rope, a coating, or as laminations etc., provided the gel phase substantially extends longitudinally from one end of the product to the other end.

The gel component is not present as an emulsion phase or dispersion (in which individual particulate gel sizes and geometries are not visible to the eye of a healthy individual).

The adjunct frozen dessert component is typically a water ice, but may be a sorbet, sherbet, ice cream etc. and might or might not itself also be, or contain, a gel. There is a difference in the rigidities of the two components of the present composition.

The method for preparing such items is embodying the ability to form a viscoelastic charged gel component and a rigid component together into a composite.

The method comprises contacting the gel component with the rigid component by processes such as molding, enrobing, spraying or co-extrusion.

DETAILED DESCRIPTION OF THE PREFERRED EMBODIMENTS OF THE INVENTION

Figure 1:
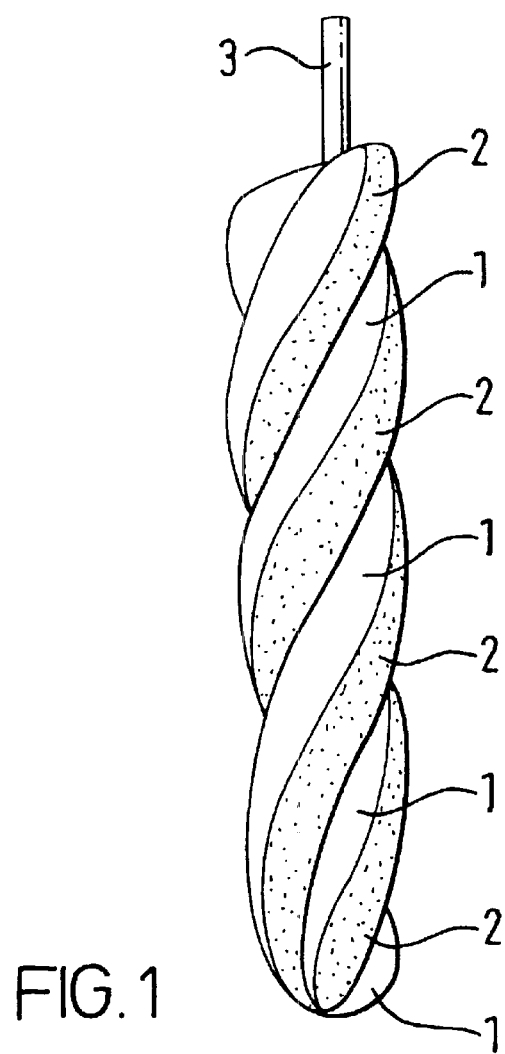
FIGS. 1 and 2 illustrate composite stick bars produced according to the invention, with FIG. 1 illustrating the original configuration and FIG. 2 illustrating the bar in a bent state.
Figure 2:
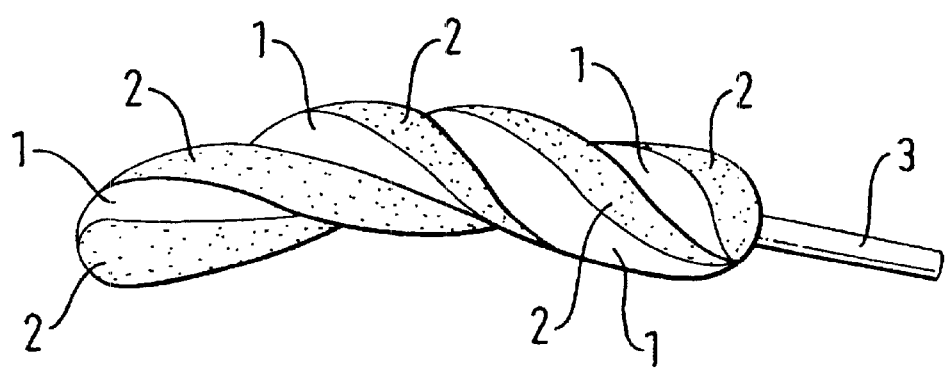

The magnitude of the adhesive forces are explained as one key feature of the specific composition.

If the adhesive forces between the gel component and a more rigid component are moderate to high, then there is little possibility of interfacial slippage. Under such circumstances, under one geometric distortion of the interface, the more rigid material (being held tightly to the interface) has little option but to crumble and break. Upon reversing the direction of the bend (completing a wobble) the particles of the more rigid component fall off.

Surprisingly, in fact the desired effect is achieved by actually permitting some interfacial slippage to occur. This is achieved by having the adhesive forces between the gel component and the rigid component at only a low to moderate level.

Under such conditions, the rigid component can adhere in parts to the gel phase, yet have other parts of its surface slip across the gel component surface. In such a manner, the rigid component, although it may still cleave in some places to help accommodate interfacial distortion stresses, it will not suffer the excessive breakages that lead to disengagement.

There is another aspect. Without wishing to be bound by theory, not only the adhesive forces, but also the avoidance or minimization of the indirect, but substantive, geometric displacements during bending, is also important regarding the unusual product tenacity of the composition of the present invention.

The avoidance of substantive surface geometric displacements is another direct consequence of the specific gel's features.

The polyanionic gel exists as a cross-linked polymer network containing a fluid. It is both viscous as well as elastic; and further, it is charged like a battery. Unlike a distorted structure (like say a knife blade), that can only store the energy of distortion by mechanical means (like a spring), the gel component of the current composition can additionally store the energy of a bend distortion by hydraulic and electrical mechanisms.

The hydraulic aspect is explained as follows. The junction zones of the polymer network within the gel are indeed displaced during the application of a bend. But, the fluid that is associated with the amorphous regions of the polymer retains a degree of freedom.

The fluid within the gel adjusts its internal positioning to relieve the applied strain and so prevents either excess dilation or excess compression at the external or internal arc surfaces respectively. The fluid stores the applied bending energy by repositioning itself in the gel. The fluid moves from the compressed area of the gel (which becomes drier) and moves to the dilated area of the gel. This minimizes the unwanted geometric displacements that are side effects, such as gel buckling that would otherwise occur. With such reduced side effects in the creation of the bend, the tendency for the rigid component to fall off the gel component is minimized.

The viscous nature of the viscoelastic gel permits a proportion of the energy of the bending to be stored as hydraulic energy rather than as mechanical (spring) energy.

The electrical aspect is explained as follows. The movement of the fluid changes the charge nature of the gel. The fluid within the gel acts as a solvent for the counter ion charges. As the solvent redistributes itself within the polyanionic gel, the localized concentration of the cationic counter ions changes. The anions associated with the more rigid junction zones are less mobile. The effect is therefore to charge up the gel like a small battery. In this manner, the applied bending energy is further stored within the gel by electric means, rather than being stored as a mechanical spring by physical structural deformation.

All three forces (mechanical, hydraulic and electrical) are active at storing energy when the gel is deformed. Yet only the "spring bending" causes any changes to surface geometry in a manner that might disengage contacting surfaces. Energy storage by the other two mechanisms minimizes changes to surface geometry.

In a similar manner, the gel does not later re-straighten solely by reverting its geometric structure by the mechanical "spring" effect. It also returns the stored energy in a similar manner to both discharging a battery, and by allowing its internal fluid to return to a lower energy positioning within the gel.

This combination of mechanisms (not just mechanical) further explains the duration of the elastic memory and the minimization of mechanical stress fracturing during repeated wobbles.

A polyanionic gelling hydrocolloid in the context of the invention is a negatively charged polymer, preferably carragenans, pectins and most preferably is kappa carrageenan.

The gels may themselves be combinations of hydrocolloids exhibiting synergistic benefits or having unique textural characteristics.

Other polyanionic gelling hydrocolloids can be used and would include most marine or seaweed extracts, e.g. agar, alginate, furcelleran etc., and certain of the microbial polysaccharides, e.g. gellan, xanthan, succinoglycan etc.

Some other hydrocolloids such as carboxymethylcellulose (CMC) that do not themselves form gels, may be benificially included in the polyanionic gel components of the present composition, for the purpose of modulation of physical properties.

Similarly, other non-polyanionic hydrocolloids may be beneficially included in the polyanionic gel components of the compositions. For example, neutral hydrocolloids that do not typically form gels on their own, may for example be included in the polyanionic gel components of the present composition for the achievement of textural and other modifications.

Such neutral hydrocolloids would include all the uncharged seed gums, particularly the galactomannans, certain extrudate gums, and even some root cell polysaccharides such as Konjac.

The levels of hydrocolloids used would depend on the finished products characteristics, on the process handling characteristics such as e.g. viscosity, set temperature, set rate etc. They should be compatible the ones with the others.

The present composition can be prepared as a total rigid system for storage and distribution, yet which during the time of consumption, warms up to create a bendy product.

As a further advantage one may mention the resistance to damage than can occur with rough handling of the products during distribution.

The present compositions do not disintegrate even when in their bendy stage of life format. Furthermore the present products have a play value and eating them is fun.

A typical product of the present invention may, for example have a gel core in the form of a rod. To the external surface of this core might be adhered strands of water ice in various geometric conformations. Such a composition of the present invention might, for example, be held at one end and jiggled like a tentacle. Despite the inherent rigidity of the water ice component, such a wobbling motion is entirely practical and during such a waggle, the water ice strands do not fall off.

In one embodiment of the present invention, a core of the gel component is present as a slightly conical cylinder and spiral stripes of water ice are present around the outside in the manner of a "helter-skelter" fun park slide's orientation.

In a variant on this embodiment one or all of the stripes are ice cream.

In another embodiment a gel component is present as the major element and a thin coating of water ice is present.

In yet another embodiment the coating is a sorbet.

Further embodiments include the presence of additional elements.

Other embodiments of the composition may similarly be adopted in which other combinations or orientations of gel and more rigid materials cause the desired effects.

One or more of the elements of the composition may additionally contain other substances including other gels, fluid masses, gases, and solids such as lipid components

EXAMPLES

The invention is further illustrated by reference to the following Examples describing in detail a product and method of the present invention. The Examples are representative and should not be construed to limit the scope of the invention in any way. In the following Examples, parts and percentages are by weight, unless stated otherwise.

Example 1 a) A gel "A" was prepared from the ingredients indicated in Table 1 below by using the method of preparation indicated below.

TABLE 1

| Ingredient | % |
|---|---|
| Before pasteurisation | |
| Water | 62.59 |
| Sucrose | 25.00 |
| Glucose Syrup, 36 DE, 80% solids | 10.00 |
| Carrageenan (kappa) | 0.24 |
| Locust bean gum (LBG) | 0.20 |
| After pasteurisation | |
| Potassium chloride aqueous solution, 10% solids | 0.75 |
| Citric acid aqueous solution, 50% solids | 1.00 |
| Flavor A | 0.20 |
| Color A solution | 0.02 | b) A water ice mix "B" was separately prepared with the ingredients as indicated in Table 2 below by using the method of preparation indicated below.

TABLE 2

| Ingredient | % |
|---|---|
| Before pasteurisation | |
| Water | 74.74 |
| Sucrose | 17.14 |
| Glucose Syrup, 36 DE, 80% solids | 5.71 |
| Guar gum | 0.20 |
| After pasteurisation | |
| Citric acid solution, 50% solids | 2.00 |
| Flavor B | 0.20 |
| Color B solution | 0.02 | c) Method of preparation
Gel A Preparation
1. The water was added to a tank.
2. 10% of the sucrose was mixed together with the hydrocolloids (carrageenan and LBG).
3. The sucrose/hydrocolloids blend was added to water and agitated under high shear. Agitation was maintained until solution was confirmed (lack of visible solid particles adhering to an inserted rod).
4. The rest of the sucrose was added under high shear agitation.
5. Glucose syrup was added and blended.
6. The sol was then pasteurised at 85° C. on an HTST (high temperature short time) plant and held at 60° C.
7. The remaining ingredients for the gel were incorporated and blended and held at 60° C. under gentle stirring.

Mixing time, in general, depends upon the mixer speed and the product viscosity. Mixing time should be minimized to that required for obtaining uniformity in the product. This time may be established by observing the distribution of the color added to the sol during the operation. Excess mixing times, such as might result from too slow stirring, should be avoided, as in such a case shear damage to a forming gel might result.

Water Ice Mix B Preparation
1. The water was added to a tank.
2. Guar gum was mixed with the sucrose.
3. The sucrose/guar gum blend was added to water and agitated under high=shear.
4. Glucose syrup was added and blended.
5. The mix was then pasteurised at 85° C. on an HTST (high temperature short time) plant, cooled to and held at 4° C.
6. The remaining ingredients for the mix were incorporated and blended and the whole held at 4° C. under gentle stirring.

Product Preparation
A composite gel and water ice stick bar was produced as from colored gel A and colored water ice B. In so doing a mold in the mold two steps molding process was used with an internal mold of frustoconical shape for the gel core in the first step and an external mold of helicoidal shape for the water ice mix in the second step. The resulting stick bars were in the shape of a contrasted colored core and spiral shell.

Using the double mold line, provided successively with a heated gel dosing unit and a standard water ice hopper, a first series of frustoconical molds for the core and a second series of helical molds for the complement were travelling through brine baths. After filling the first series of smooth-walled molds with gel A, the cores were quiescently frozen, stick were inserted, the sticked centers were demolded by surface-heating of the first molds and the cores were placed into the second series of wavy-walled molds which were partly filled with water ice mix B. In doing so, the liquid ice mix B filled the empty spaces of the second molds and the whole was quiescently frozen. After demolding by heating the surface of the second molds, the products were surface-hardened, wrapped and stored at −30° C.

The composite stick bars so produced, illustrated in the accompanying FIGS. 1 (original configuration) and 2 (shown in a bent state), had a contrasting aspect and a contrasted texture of gel as a slightly conical cylinder core 1 and spiral stripes 2 of water ice present around the outside in the manner of a "helter-skelter" fun park slide's orientation, and a stick 3. It is possible to have gels in both fillings or gel in combination with any other frozen confection in this product.

What is claimed is:

1. A composite frozen confection containing one or more component block(s) of polyanionic gel(s) in conjunction with more rigid component such that:
   a) during warming to room temperature the confection develops flexibility,
   b) when flexible, the confection may be bent or wobbled such that one end may distort to an angle of at least 5 degrees from other end and
   c) during the first 4 distortions, not more than 5% by weight of the rigid component falls off.

2. A composite frozen confection according to claim 1 in which the rigid component is a water ice, sorbet, sherbet, ice cream or other frozen dessert component.

3. A composite frozen confection according to claim 1, in which the gel phase is separate, as a distinct and elongated component block, such as a filling, a layer, a rope, a coating, or as laminations, provided the gel phase substantially extends longitudinally from one end of the product to the other end.

4. A composite frozen confection according to claim 1, in which the polyanionic gel is based on kappa-carrageenan.

5. A composite frozen confection according to claim 1, in the form of a stick bar.

6. A composite frozen confection according to claim 5, which have a gel core in the form of a rod and water ice in various geometric conformations adhered to the external surface of the core.

7. A composite frozen confection according to claim 6, in which the core of the gel component is present as a slightly conical cylinder and spiral stripes of water ice are present around the outside in the manner of a "helter-skelter" fun park slide's orientation.

8. A method for preparing a composite frozen confection according to claim 1, in which the gel component is contacted with the rigid component by molding, enrobing, spraying or co-extrusion.

9. A method according to claim 8, which comprises filling molds with a water ice mix, forming a frozen layer on the side wall of the molds, removing any unfrozen water ice mix from the molds and filling empty spaces in the molds with heated gel in order to produce a shell and core split, quiescently freezing the filled molds, inserting sticks, demolding and packaging the stick bars.

10. A method according to claim 8, which comprises utilizing a two step molding process wherein an internal mold of frustoconical shape is used for the gel core in a first step and an external mold of helicoidal shape is used for a water ice mix in a second step, filling the first series molds with the gel, quiescently freezing the cores, inserting sticks, demolding the sticked centers by surface-heating of the first molds, partly filling the second series of molds with water ice mix and placing the cores into the second series of molds, the liquid ice thus filling the empty spaces of the second molds and quiescently freezing the whole so that the water ice mix forms the more rigid component, demolding and packaging the stick bars.

* * * * *

UNITED STATES PATENT AND TRADEMARK OFFICE
CERTIFICATE OF CORRECTION

PATENT NO.      : 6,645,538 B2
DATED           : November 11, 2003
INVENTOR(S)     : Best et al.

It is certified that error appears in the above-identified patent and that said Letters Patent is hereby corrected as shown below:

<u>Title page,</u>
Item [75], Inventors, delete "Thomas Eric Best" and insert -- Eric Thomas Best --.
Item [56], References Cited, OTHER PUBLICATIONS, "Chen, Y., et al." reference, delete "carageenan" and insert -- carrageenan --.

Signed and Sealed this

Second Day of March, 2004

JON W. DUDAS
*Acting Director of the United States Patent and Trademark Office*